United States Patent
Nilsson

(10) Patent No.: US 12,053,084 B2
(45) Date of Patent: Aug. 6, 2024

(54) BRACKET PLUG

(71) Applicant: Elfa International AB, Västervik (SE)

(72) Inventor: Peter Nilsson, Västervik (SE)

( * ) Notice: Subject to any disclaimer, the term of this patent is extended or adjusted under 35 U.S.C. 154(b) by 119 days.

(21) Appl. No.: 17/788,306

(22) PCT Filed: Dec. 21, 2020

(86) PCT No.: PCT/SE2020/051247
§ 371 (c)(1),
(2) Date: Jun. 23, 2022

(87) PCT Pub. No.: WO2021/133241
PCT Pub. Date: Jul. 1, 2021

(65) Prior Publication Data
US 2023/0023464 A1    Jan. 26, 2023

(30) Foreign Application Priority Data
Dec. 23, 2019    (SE) ................... 1951547-7

(51) Int. Cl.
*A47B 57/42*    (2006.01)
*A47B 96/06*    (2006.01)

(52) U.S. Cl.
CPC ............ *A47B 57/42* (2013.01); *A47B 96/061* (2013.01)

(58) Field of Classification Search
CPC ....... A47B 57/42; A47B 96/061; A47B 57/52; A47B 96/1408; A47B 2230/0051; A47B 2230/07; A47B 96/028; A47B 2230/0029; A47B 2230/0037; F16B 12/10; F16B 2012/103

USPC .............. 248/239; 108/108, 147.17
See application file for complete search history.

(56) References Cited

U.S. PATENT DOCUMENTS

| | | | |
|---|---|---|---|
| D26,771 S | 3/1897 | Held | |
| 1,393,012 A | 10/1921 | Dilg | |
| 1,829,009 A | 10/1931 | Madsen | |
| 2,104,831 A | 1/1938 | Dauskardt | |
| 2,622,834 A * | 12/1952 | Sparring | A47B 57/42 248/243 |
| 2,767,950 A | 10/1956 | Bellon et al. | |
| 3,220,363 A * | 11/1965 | Gingher | A47B 96/027 108/29 |

(Continued)

FOREIGN PATENT DOCUMENTS

| CA | 2380800 C * | 12/2006 | ......... A47J 37/0786 |
|---|---|---|---|
| CN | 301497888 | 3/2011 | |

(Continued)

OTHER PUBLICATIONS

Notice of Allowance dated Aug. 10, 2022 for U.S. Appl. No. 29/739,089 (pp. 1-6).

(Continued)

*Primary Examiner* — Kimberly T Wood
(74) *Attorney, Agent, or Firm* — Hubbard Law, PLLC; Marc A. Hubbard

(57) ABSTRACT

A storage system comprises a shelf (5) supported by a cantilevered bracket (4) and a connector element (6), connecting the bracket (4) with the shelf (5). The bracket (4) has a U-shaped cross-section. The connector element (6) comprises an insert (9), which is arranged inside the U-shaped cross-section of the bracket (4) and a dowel (10), which extends from the insert (9) into the shelf (5).

13 Claims, 3 Drawing Sheets

(56) References Cited

U.S. PATENT DOCUMENTS

| | | |
|---|---|---|
| 3,235,219 A | 2/1966 | Green |
| 3,259,079 A | 7/1966 | Freeman |
| D225,508 S | 12/1972 | Freeman |
| 3,759,191 A | 9/1973 | Freeman |
| 3,826,207 A * | 7/1974 | Sutherlan ............ A47B 57/485 |
| | | 211/90.01 |
| 3,835,610 A | 9/1974 | Harper |
| 3,921,280 A | 11/1975 | King, Jr. |
| D243,440 S | 2/1977 | Strinning |
| 4,060,949 A | 12/1977 | Busse |
| D251,108 S | 2/1979 | Desilets |
| 4,198,913 A * | 4/1980 | Haworth ............. A47B 96/061 |
| | | 108/142 |
| 4,236,848 A | 12/1980 | Roeck |
| D260,717 S | 9/1981 | Gusdorf |
| 4,836,729 A | 6/1989 | Bisping et al. |
| 5,004,202 A * | 4/1991 | Stumpf ................ A47B 96/061 |
| | | 211/187 |
| 5,069,408 A | 12/1991 | Bessinger |
| D354,432 S | 1/1995 | Starman |
| 5,709,441 A * | 1/1998 | Bartling ............... A47B 87/007 |
| | | 312/223.5 |
| D393,417 S | 4/1998 | Glickman |
| 5,788,395 A * | 8/1998 | Grieser ............... F16B 12/2036 |
| | | 403/231 |
| 6,123,303 A * | 9/2000 | Huang ................. A47B 96/025 |
| | | 211/90.02 |
| D449,222 S | 10/2001 | Young |
| 6,345,579 B1 * | 2/2002 | Zaturensky .......... A47B 96/028 |
| | | 248/250 |
| 6,378,712 B1 * | 4/2002 | Sampl .................... A47B 47/04 |
| | | 211/186 |
| 6,691,964 B1 * | 2/2004 | Schaefer ............. A47B 96/061 |
| | | 248/220.21 |
| D506,384 S | 6/2005 | Lawrence et al. |
| D558,673 S | 1/2008 | Easley |
| D618,989 S | 7/2010 | Shpitalni |
| D623,929 S | 9/2010 | Jarvis et al. |
| D705,044 S | 5/2014 | Hammac et al. |
| D867,106 S | 11/2019 | Blattel |
| 10,753,381 B2 | 8/2020 | Grabher |
| D909,178 S | 2/2021 | Hollingworth |
| D938,266 S | 12/2021 | Jones |
| D973,476 S | 12/2022 | Ryden |
| 2003/0233965 A1 | 12/2003 | Brazier |
| 2003/0234231 A1 | 12/2003 | Rowe |
| 2009/0139943 A1 | 6/2009 | Fernandez |
| 2015/0152904 A1 | 6/2015 | Nilsson |
| 2016/0157610 A1 | 6/2016 | Chen et al. |
| 2017/0159691 A1 | 6/2017 | Pelc, Jr. |
| 2018/0031020 A1 | 2/2018 | Chen et al. |
| 2018/0172048 A1 | 6/2018 | Rovoletto |
| 2018/0347608 A1 | 12/2018 | Haser |
| 2019/0216216 A1 | 7/2019 | Cooper et al. |
| 2020/0288866 A1 * | 9/2020 | Richard ................. A47B 96/06 |
| 2020/0370584 A1 | 11/2020 | Sjostedt |
| 2021/0003159 A1 | 1/2021 | Thomson |
| 2021/0025422 A1 | 1/2021 | Ender-Lercher |
| 2021/0131469 A1 | 5/2021 | Simpson |
| 2021/0254648 A1 | 8/2021 | Leistert |

FOREIGN PATENT DOCUMENTS

| | | |
|---|---|---|
| DE | 10354114 A1 | 8/2004 |
| EM | 0025369790001 | 9/2014 |
| GB | 320487 A | 10/1929 |
| GB | 2393226 A | 3/2004 |
| IL | 47015 | 6/1978 |
| JP | D1323924 | 3/2008 |
| JP | D1598914 | 3/2018 |
| JP | D1627427 | 3/2019 |
| KR | 3004952960000 | 7/2008 |
| KR | 3004952970000 | 7/2008 |
| KR | 3005304190000 | 6/2009 |
| KR | 200473219 Y1 * | 6/2014 |
| WO | 2004000072 A1 | 12/2003 |
| WO | 2004000073 A1 | 12/2003 |

OTHER PUBLICATIONS

Office Action dated Apr. 26, 2022 for U.S. Appl. No. 29/739,089 (pp. 1-4).

Office Action dated Feb. 4, 2022 for U.S. Appl. No. 29/739,089 (pp. 1-8).

Restriction and Election Requirement issued in Design U.S. Appl. No. 29/739,089, mailed Oct. 6, 2021.

International Search Report and Written Opinion received in Patent Cooperation Treaty Application No. PCT/SE2020/051247, dated Feb. 15, 2021.

* cited by examiner

BRACKET PLUG

RELATED APPLICATION

This application, a national phase application of Patent Cooperation Treaty Application No. PCT/SE2020/051247 filed Dec. 21, 2020, which claims priority to Swedish Application No. 1951547-7 filed Dec. 23, 2019.

FIELD OF THE INVENTION

The present invention relates to a storage system comprising a shelf supported by a cantilevered bracket, having a U-shaped cross-section, and a connector element, connecting the bracket with the shelf.

BACKGROUND

Cantilevered brackets extending from vertically arranged hang standards are well known in the field of the invention. The brackets are arranged in groups of two or more brackets at the same height on parallel hang standards, in order to support a shelf. The shelf is placed on top of the brackets, and optionally a screw or a corresponding fixing element is screwed through the bracket into the shelf.

One problem with the prior art is that separate fixing elements, such as screws, need to be used for establishing the connection between the shelf and the bracket. At least a screwdriver will be needed for the installation of the shelf. In order to avoid scratching the surfaces or otherwise damage the shelf or the bracket, personnel with sufficient skills and experience should be employed.

Another difficulty is that rearrangement of the shelves may demand a loosening of the screws from the brackets. The screw holes in the shelf may be worn after repeated unscrewing and rescrewing of the screws, and the life span of the shelf may be reduced by repeated rearrangements.

A further disadvantage is that the screws need to be tightened from the bottom side of the shelf, thereby demanding an uncomfortable working position for the person assembling the storage system. As an alternative, the shelves may be temporarily turned for an easier fastening of the brackets thereon, but such a proceeding will place high demands on measuring and precision in order to ensure that the brackets are fixed in a correct position for cooperation with the hang standards.

An even further disadvantage is that the head of the screw will extend from the outer surface of the bracket to a certain degree. This may be considered as a visual disadvantage. Also, there is a small risk that a user or other physical objects will receive minor scratches from unintentional contact with the head of the screw.

SUMMARY

It is an object of the present invention to solve, or at least mitigate, parts, or all of, the abovementioned problems. To this end, there is provided a connector element comprising an insert arranged inside the U-shaped cross-section of the bracket and a dowel extending from the insert into the shelf.

Hereby the effect of providing a bracket system with a limited number of components that do not need any tools for assembly is attained. The shelf will be secured to the bracket by means that are mainly hidden from view in the assembled state, thereby creating an aesthetically pleasing impression. The assembly, mounting, and remounting of the brackets and the shelf supported thereon may easily be performed by an unskilled person.

In an embodiment the insert of the connector element extends between a curved bottom portion of the bracket and a top portion with two sides of the cross section of the U-shaped bracket.

The technical effect of these features is that the insert is adapted to the inner shape of the bracket, thereby creating a stable connection between the bracket and the shelf supported thereon.

In a further embodiment, the dowel extends in the longitudinal direction of the connector element.

The dowel will provide an alignment of the bore of the shelf and the connector element, thereby keeping the shelf in its place on the bracket.

In a further embodiment, a bore in the shelf is provided with a coupling sleeve for receiving the dowel, extending in the longitudinal direction of the connector element.

The technical effect of this is that the coupling sleeve extends upwards in its mounted position and is in a position where it is ready to be inserted into bores in the shelf that is to be mounted on the bracket.

In a still further embodiment, the coupling sleeve comprises circumferentially extending ribs for contact with the inside of the bore in the supported shelf.

The technical effect of the ribs is that the coupling sleeve may stay in its position in the bore in the shelf, after it has been inserted therein. Thereby an easy dismounting of a mounted shelf will be possible without the use of any particular tools. Also, the wear on the shelf and the holes therein will be reduced.

In an even further embodiment. the coupling sleeve comprises a number of longitudinally extending tabs, which are spaced apart circumferentially.

The technical effect is that the coupling sleeve is not completely rigid in its circumferential direction. It may be slightly compressed, if the tabs are bent slightly inwards, and the tabs may spring back into their original positions after the temporary compression. The tabs may then accommodate an inserted dowel and provide a satisfactory interaction therewith.

In another embodiment the coupling sleeve comprises a bead on each tab and the dowel comprises a narrowed region for snap-fastening interaction with the tabs.

A dowel which has been inserted into a bore which is lined with a coupling sleeve may reach a very good interaction with the coupling sleeve, and thereby with the shelf, while at the same time the interconnection is easily reversible, in case of a need for rearrangement of one or more shelves.

In a further embodiment, the insert has laterally extending flanges with an outer shape which is complementary to the inside shape of the sides of the bracket.

The laterally extending flanges serve several purposes. One object is to limit the thickness of the material, since the insert, as well as other components in the system may be manufactured from plastics by injection molding. An even thickness of the material in plastic components allows for a speedy manufacture, due to speedy cooling, as well as for a minimized risk for deformation during cooling when the manufactured component has been released from its mold.

In an even further embodiment, a first end of the insert has an outer shape, which is complementary to the curved inside shape of the bottom of the U-shaped bracket.

Hereby the insert may provide an alignment of the shelf in relation to the bracket. When the insert is in a stable position, guided by the inner contours of the bracket, the dowel may also be aligned with the intended position of the bore in the shelf.

In a further embodiment a first end of the insert, at the bottom of the bracket, has a receiving socket for a lock plug.

Hence the insert may be kept in its position in the longitudinal direction of the bracket. Also, the insert may not be lifted in its longitudinal direction, out of the bracket. Thereby the shelf may also be kept in its intended position.

In a yet further embodiment, the receiving socket is arranged in a direction which is a normal to the bottom portion of the bracket.

The lock plug may then have a symmetrical disposition, so that it may be insertable into the socket with any of several orientations. Yet, if the bottom of the bracket is arranged at an angle with the plane of the shelf supported thereon, the outer part of the lock plug may be arranged as snug as possible with the outer surface of the bracket. The outer part of the lock plug may hence be curved along one axis, so that it may fit snugly along the curved outer surface of the bracket.

In even further embodiments the receiving socket is surrounded by a protruding area, the outer profile of the protruding area being complementary to a fixing hole in the bracket.

The protruding area will contribute to aligning the insert with the hole. This is especially the case if the protruding area is not rotatable in the fixing hole.

Further embodiments disclose that the lock plug comprises a shaft and a head, the head having a curvature corresponding to the outer curvature of the bottom of the U-shaped bracket.

With such a shape of the head, the lock plug may conform even closer to the outer curvature of the bracket.

Finally, there are embodiments wherein one or more of the components, including the connection element, the coupling sleeve, and the lock plug is manufactured by injection molding.

It is noted that embodiments of the invention may be embodied by all possible combinations of features recited in the claims. Further, it will be appreciated that the various embodiments described for the device are all combinable with the method as defined in accordance with the second aspect of the present invention, and vice versa.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

Figure 1:
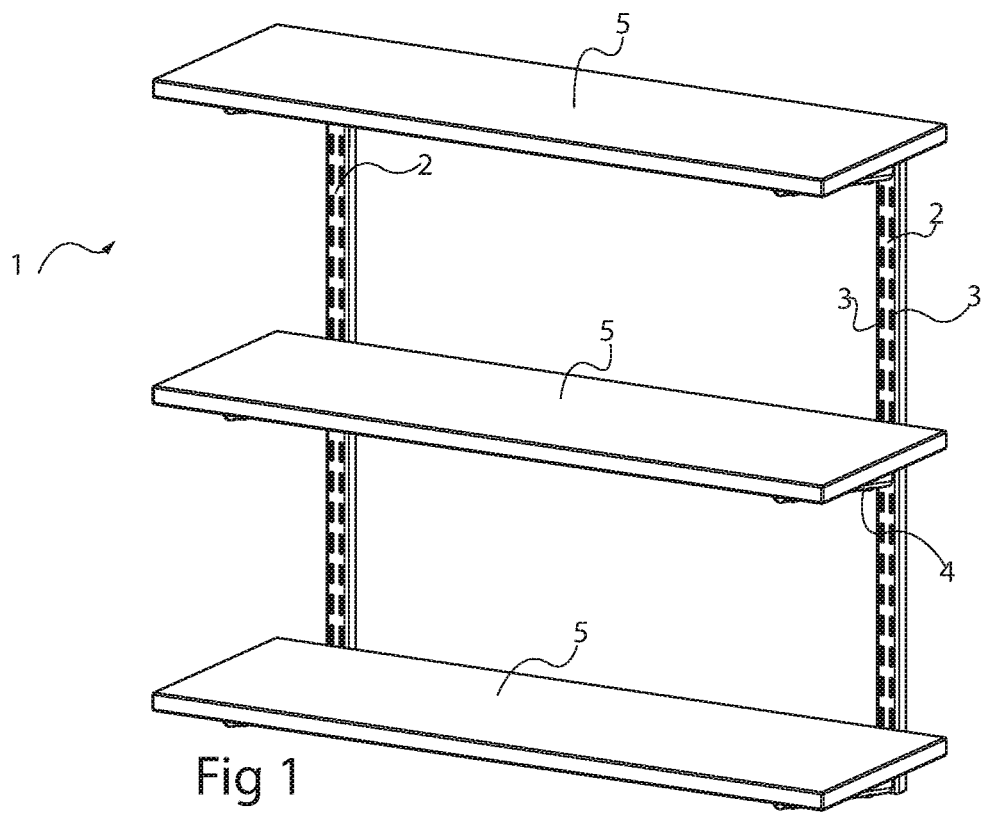
FIG. 1 is a view in perspective of a storage system according to the present disclosure.

In FIG. 1 a storage system 1 according to the present disclosure is shown in general. The storage system 1 comprises at least two hang standards 2, i. e. upright tracks with a series of slots 3, wherein cantilevered brackets 4, or other supporting devices, are mountable. The hang standards 2 are typically profiled, made of a metallic material, and often surface treated, e.g. coated. Shelves 5 are arranged on the brackets 4 in FIG. 1, although other load-carrying components, such as rails, baskets, rods etc. may be included in the storage system 1 and arranged on or in connection with the brackets 4. In FIG. 1 each shelf 5 is supported by two brackets 4, but, depending on the width of the shelves 5, three or more brackets 4 and hang standards 2 may be used for supporting each shelf 5.

Figure 2:
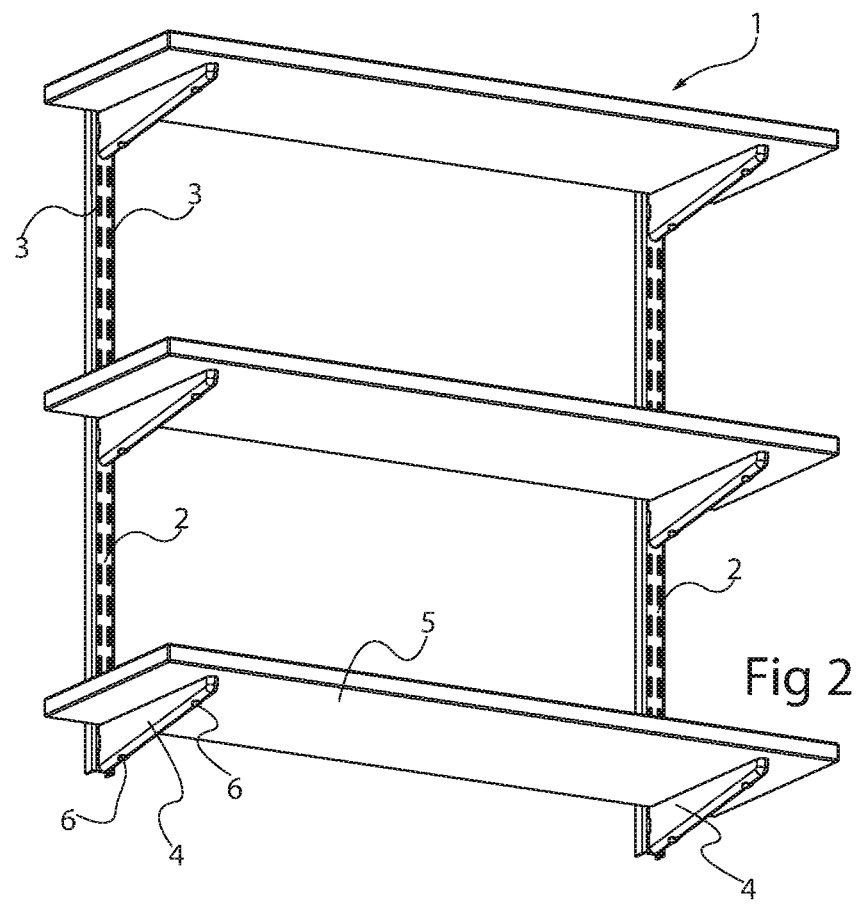
FIG. 2 is a perspective view of the storage system as seen from below.

In order to optionally secure each shelf 5 on its associated brackets 4, at least one connector element 6 extends, according to the present disclosure, from each bracket 4 into the shelf 5, as seen in FIG. 2. In order to keep the upper side of the shelf 5 as smooth as possible, the connector element 6 is advantageously arranged from the bottom side of the shelf 5. Instead of arranging screws through the brackets 4 and into the bottom side of the shelf 5, the connector element 6 is arranged by preparation of bores in the shelf 5, advantageously at the manufacturing site, so that both proper alignment and conformity with the hang standards 2 are ensured.

The brackets 4 have, in the disclosed embodiments, such a profile that their inner ends, closest to the hang standards, are deeper than their outer ends near the edges of the shelves 5, i. e. the brackets 4 are tapering towards their outer ends extending away from the hang standard 2.

Figure 3:
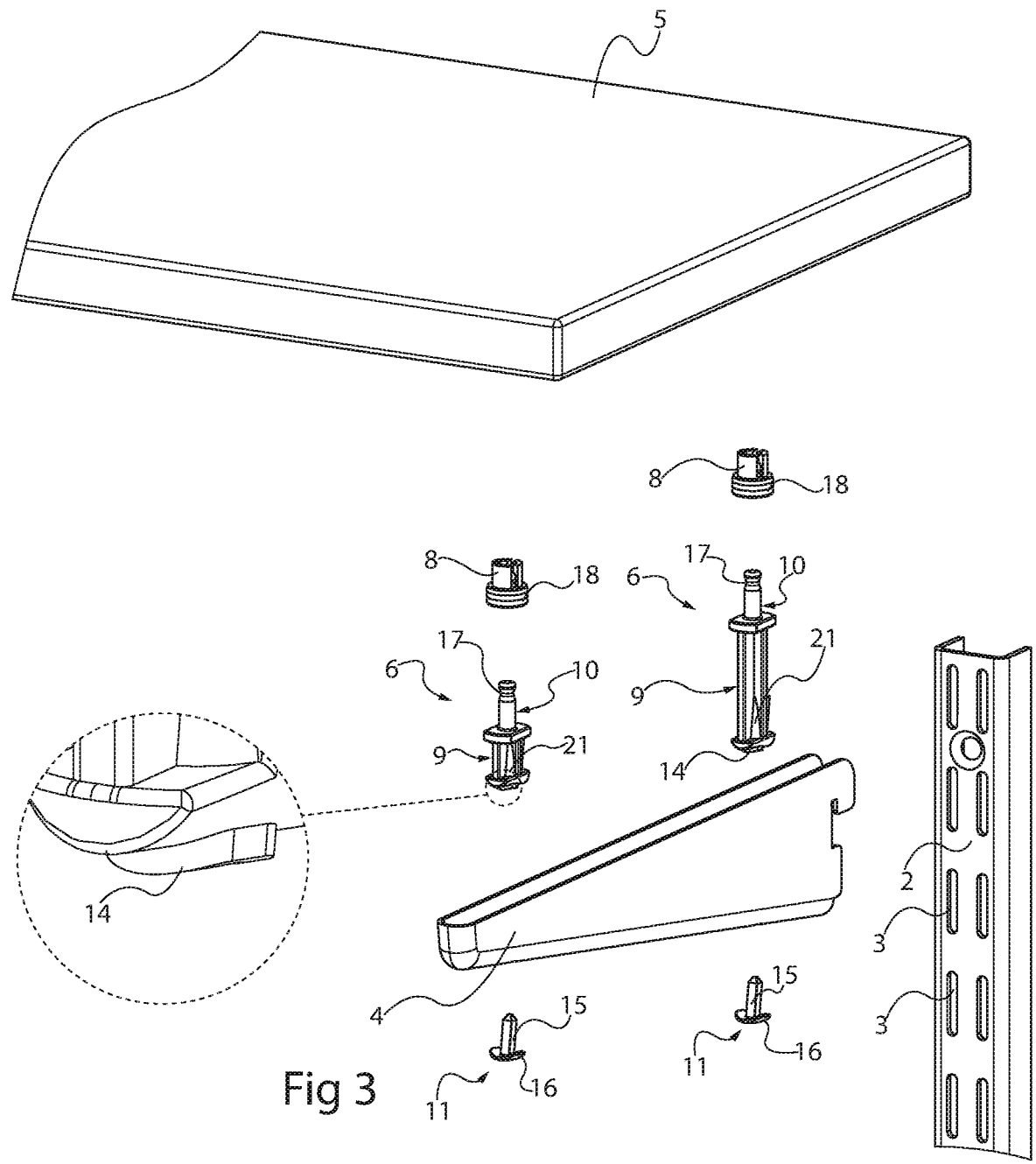
FIG. 3 is an exploded view of a part of the storage system.
Figure 4:
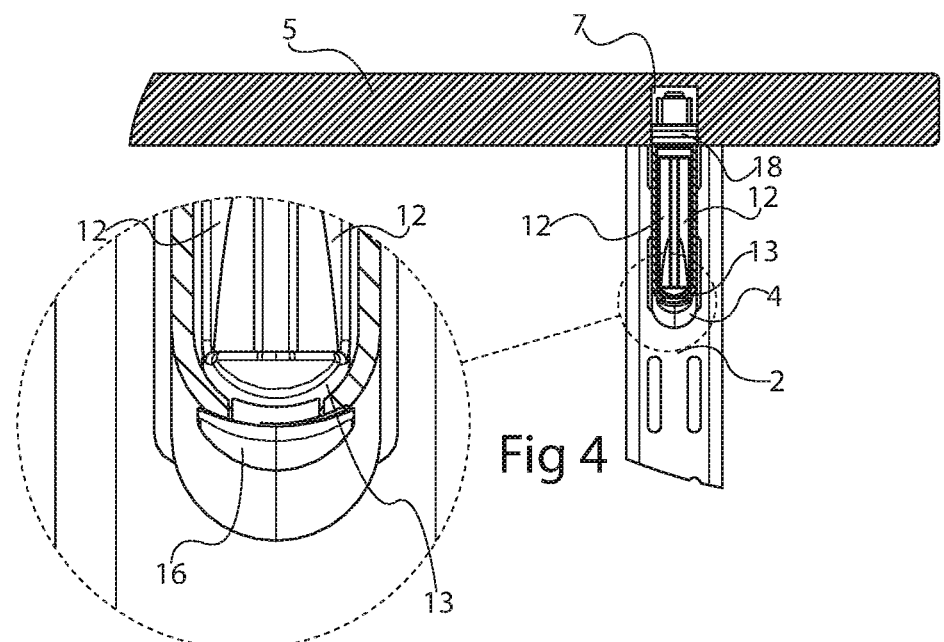
FIG. 4 is a section of a part of the storage system.
Figure 5:
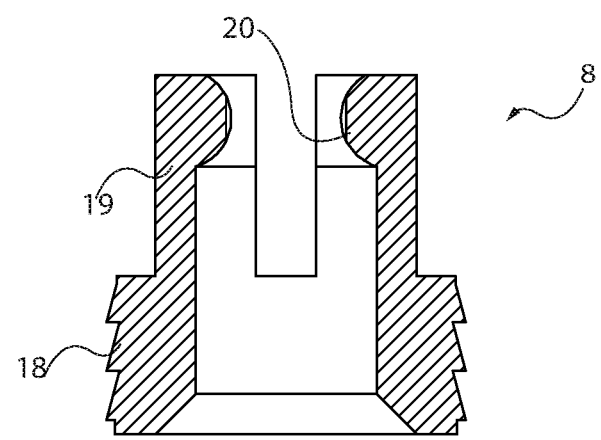
FIG. 5 is a section of a coupling sleeve included in the storage system.

The bores 7 are, in the embodiments disclosed in FIGS. 3 to 5, lined with coupling sleeves 8. The coupling sleeves 8 are arranged in the bores 7 either at the manufacturing site or at the installation site by the person performing the assembly and installation of the storage system 1.

A number of connector elements 6 are arranged in each bracket 4, as shown in FIG. 3, where two connector elements 6 are provided to connect the bracket 4 with the shelf 5. The connector elements 6 are of mutually different lengths, adapted to their respective intended positions in the bracket 4, and conforming to the gradually varying depth of the bracket 4.

Each connector element 6 comprises an insert 9 and a dowel 10. Each insert 9 is elongated and its length optionally corresponds to the depth of the bracket 4 in the region of the intended position of the connector element 6, i. e. corresponding to the depth at the location of one of the bores 7 in the shelf 5.

The insert 9 comprises a series of lateral flanges 12, which extend from the center of the insert 9. Their respective thicknesses are selected such that an even thickness of material in the insert 9 is attained, since an even thickness is advantageous during the manufacture of the connector element 6, i. e. by injection molding. The outer profiles of the flanges are complementary to the inner cross section of the bracket 4 in the intended position of the respective connector element 6.

One end 13 of the insert 9 has a curved cross section thereby conforming to the inner cross section of the bracket 4 in its bottom region, where it is U-shaped. In a direction transversal to the U-shaped cross section, the end 13 of the insert 9 is slanting, thereby conforming to the varying depth of the bracket 4. A close conformity between the outer profile of the insert 9 and the inner profile of the bracket 4 results in a positioning of the insert 9 in the bracket 4, and consequently in a positioning of the shelf 5 in relation to the bracket 4.

In the disclosed examples, the positioning end 13 of the insert has a socket 21 for a lock plug 11, which is provided to extend from the outside of the bracket 4, through a bore in its curved bottom region and into the curved end 13 of the insert 9. Hereby the insert 9 is fixed in relation to the bracket 4, both in the longitudinal direction of the bracket 4 and in the transversal direction thereof, i. e. the insert 9 is fixed both in its longitudinal and transversal directions.

The socket 21 is in the examples arranged at an angle to the longitudinal direction of the insert 9. When the insert 9 is positioned in the bracket 4, the direction of the socket 21 is transversal to the bottom portion of the bracket 4, in some embodiments approximately normal thereto.

A further positioning of the insert 9 in the bracket 4 may be attained by providing the positioning end 13 of the insert 9 with a protruding area 14 around the socket 21 for the lock plug 11.

The lock plug 11 may advantageously comprise a shaft 15 and a head 16. The lock plug 11 may then have the general appearance of a thumb tack with a curved head portion. The shaft 15 preferably has a non-circular cross section, such as square, oval, rhomboid, etc. so that it will remain in the same position as inserted. The head 16 has a curvature corresponding to the outer curvature of the bottom of the U-shaped bracket. Hence the visual impression will be aesthetically pleasing, and the head 16 will be smooth and not pose a risk for injuries or damages to objects.

The dowel 10 extends from the insert 9 in the longitudinal direction of the connector element 6. When the shelf 5 is to be connected with the bracket 4, the dowel 10 extends into the bore 7 in the shelf 5. In the embodiment shown in FIGS. 3 to 5, there is a coupling sleeve 8 inserted into the bore 7, and the dowel 10 will interact with the coupling sleeve 8, in order to attain a reliable fixation of the shelf 5 on the bracket 4. The dowel 10 has a narrow portion 17, which interacts with parts of the coupling sleeve 8 for a snap-fastening therein.

The coupling sleeve 8 is in the disclosed examples provided with circumferential ribs 18, which have an outer circumference virtually corresponding to that of the bore 7, so that the outer edges of the ribs 18 may cut into the inner walls of the bore 7, and the coupling sleeve 8 may remain securely in the bore 7.

The provision of a coupling sleeve 8 is advantageous in that while the bracket 4 is hereby able to carry loads in a direction approximately at a normal to the plane of the shelf 5, the coupling sleeve 8 and the dowel 10 interact to prevent movements of the shelf 5 in the plane thereof.

In at least some of the examples herein, an advantageous configuration of the upper surface of the insert 9 is disclosed. In these examples the upper surface is arranged to be aligned with the upper ends of the U-shaped bracket 4, so that an even surface is obtained as a support for the shelf 5.

In the disclosed examples, the coupling sleeve 8 is also provided with one or more tabs 19, which are mutually spaced apart around the circumference of the coupling sleeve 8. The tabs 19 are slightly flexible, and when a dowel 10 is introduced centrally between them, they will spring back slightly in order to let it pass. The inward sides of the tabs 19 are provided with beads 20, which come into contact with an introduced dowel 10. The beads 20 cooperate with the narrow portion 17 of the dowel 10, thereby providing a snap-fastening function between the shelf 5 and the bracket 4.

The provision of the coupling sleeve 8 and the dowel 10 may render unnecessary the use of any screws for fastening the shelf 5 to the bracket 4.

The invention has mainly been described above with reference to a few embodiments. However, as is readily appreciated by a person skilled in the art, other embodiments than the ones disclosed above are equally possible within the scope of the invention, as defined by the appended patent claims.

For example, the dowel 10 has been shown and described as a pin-like portion which is insertable into the coupling sleeve 8 in the bore 7 in the shelf 5. In alternative embodiments the coupling sleeve 8 may be omitted, and the dowel 10 may be wider than shown, thereby cooperating directly with the inner wall of the bore 7. Especially, the dowel 10 may be designed in such a way that its outer contours correspond to the outer contours of the coupling sleeve 8 described above.

In the claims, the word "comprising" does not exclude other elements or steps, and the indefinite article "a" or "an" does not exclude a plurality.

The invention claimed is:

1. A storage system comprising a shelf supported by a cantilevered bracket having a U-shaped cross-section formed two sides joined by a curved bottom portion, and a connector element that is elongated along a longitudinal axis and connects the bracket with the shelf, the connector element comprising an insert that is arranged inside the U-shaped cross-section of the bracket and extends along the longitudinal axis and a dowel that extends along the longitudinal axis from the insert into the shelf.

2. The storage system according to claim 1, wherein the insert of the connector element extends between the curved bottom portion of the bracket and an upper end of each the two sides of the U-shaped bracket.

3. The storage system according to claim 1, wherein a bore in the shelf is provided with a coupling sleeve for receiving the dowel, extending along the longitudinal axis of the connector element.

4. The storage system according to claim 3, wherein the coupling sleeve comprises circumferentially extending ribs for contact with the inside of the bore in the supported shelf.

5. The storage system according to claim 4, wherein the coupling sleeve comprises a plurality of longitudinally extending tabs, which are spaced apart circumferentially.

6. The storage system according to claim 5, wherein the coupling sleeve comprises a bead on each tab and the dowel comprises a narrowed region for snap-fastening interaction with the tabs.

7. The storage system according to claim 1, wherein the insert has laterally extending flanges with outer shapes that are complementary to an inner cross section of the bracket.

8. The storage system according claim 1, wherein a first end of the insert has an outer profile which is complementary to a curved inner profile of the curved bottom portion of the U-shaped bracket.

9. The storage system according to claim 1, wherein a first end of the insert, at the curved bottom portion of the bracket, has a receiving socket for a lock plug.

10. The storage system according to claim 9, wherein the receiving socket is arranged in a direction that is to the curved bottom region of the bracket.

11. The storage system according to claim 9, wherein the receiving socket is surrounded by a protruding area, such that the insert is guided into a position in a fixing hole in the bracket.

12. The storage system according to claim 9, wherein the lock plug comprises a shaft and a head, the head having a curvature corresponding to an outer curvature of the curved bottom portion of the U-shaped bracket.

13. The storage system according to claim 1, the system including at least a lock plug, for keeping the connector element in place, and a coupling sleeve, for receiving the dowel, wherein any one or more of the connector element, the coupling sleeve, and the lock plug are manufactured by injection molding.

\* \* \* \* \*